No. 731,495. PATENTED JUNE 23, 1903.
A. POIDATZ.
UNIVERSAL JOINT.
APPLICATION FILED FEB. 5, 1903.
NO MODEL.
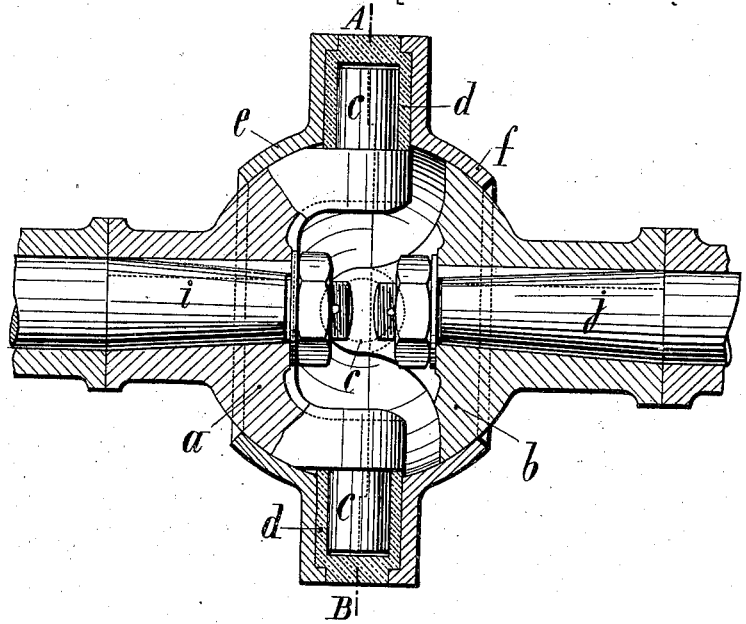
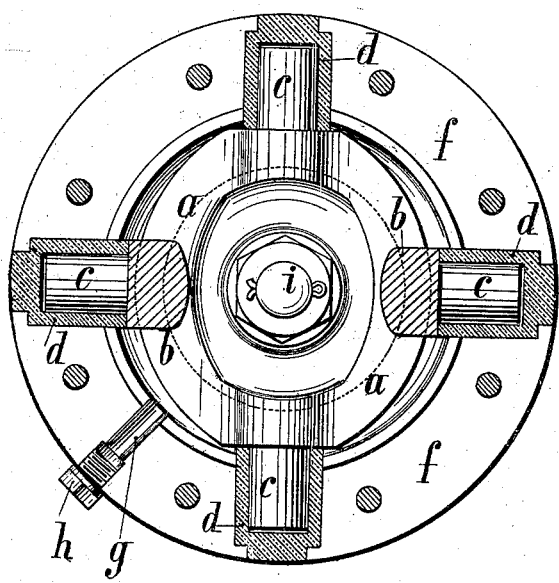
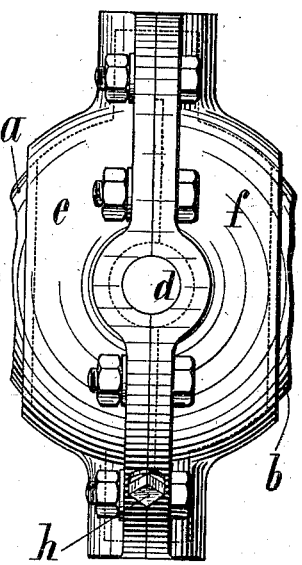

No. 731,495. Patented June 23, 1903.

UNITED STATES PATENT OFFICE.

ALFRED POIDATZ, OF PARIS, FRANCE, ASSIGNOR TO SOCIÉTÉ NOUVELLE DES ETABLISSEMENTS DECAUVILLE AÎNÉ, OF PARIS, FRANCE.

UNIVERSAL JOINT.

SPECIFICATION forming part of Letters Patent No. 731,495, dated June 23, 1903.

Application filed February 5, 1903. Serial No. 142,021. (No model.)

*To all whom it may concern:*

Be it known that I, ALFRED POIDATZ, a citizen of the Republic of France, residing at Paris, France, have invented certain new and useful Improvements in or Relating to Universal Joints, of which the following is a specification.

The universal joint according to this invention is applicable generally, but is intended more particularly for use in transmitting motion in motor-cars.

A universal joint according to this invention is illustrated by way of example in the accompanying drawings.

Figure 1 is a longitudinal section. Fig. 2 is an end view in vertical cross-section on the line A B of Fig. 1, and Fig. 3 is a side elevation.

The joint is chiefly constituted by the combination of two exactly similar heads $a$ $b$ with external semispherical surface and provided with diametrically opposite trunnions $c$, the axis of each set of two trunnions $c$ of the heads $a$ and $b$ being arranged in the same plane normally to each other. These parts are articulated in bearings $d$, supporting the trunnions $c$, and the whole is connected by means of two semispherical cases or covers $e f$, inclosing the said bearings $d$ and strongly bolted together and forming, in combination with the two heads $a$ $b$, a tightly-closed tank for lubricating material, which is always closed whatever be the angle formed during working by the two shafts $i j$, which are connected by the said universal joint for the purpose of transmitting the movement from one to the other. The lubricating material is introduced through a passage $g$, formed in one of the faces of the casing $e f$. The passage $g$ is closed by a screw-plug $h$. Lubrication is effected automatically, owing to the oil being projected directly on the trunnions $c$ of the heads $a$ $b$, as well as on the surfaces in contact, by the centrifugal force resulting from the rotation of the whole of the device.

What I claim as my invention, and desire to secure by Letters Patent, is—

1. A universal joint particularly intended for the transmission of movement in motor-cars, comprising two heads provided with trunnions and with semispherical outside surfaces, one set of trunnions being arranged at right angles to the other, bearings for the trunnions and two semispherical casings connecting the said heads and inclosing the bearings of their trunnions $c$ and with the heads forming a lubricant-reservoir substantially as described.

2. A universal joint comprising two oppositely-arranged shaft-bearing heads with semispherical outer surfaces trunnions on one head arranged at right angles to trunnions on the other head, journals for said trunnions, and a two-part closing semispherical casing securing the heads together substantially as described.

In testimony whereof I have signed my name to this specification in the presence of two subscribing witnesses.

ALFRED POIDATZ.

Witnesses:
LOUIS SULLIGER,
AUGUSTUS E. INGRAM.